(12) United States Patent
Sugaki et al.

(10) Patent No.: US 10,099,778 B2
(45) Date of Patent: Oct. 16, 2018

(54) UNMANNED AERIAL VEHICLE

(71) Applicant: PRODRONE CO., LTD., Nagoya-shi, Aichi (JP)

(72) Inventors: Kiyokazu Sugaki, Nagoya (JP); Kazuo Ichihara, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 0 days.

(21) Appl. No.: 15/759,811

(22) PCT Filed: Sep. 6, 2016

(86) PCT No.: PCT/JP2016/076151
§ 371 (c)(1),
(2) Date: Mar. 13, 2018

(87) PCT Pub. No.: WO2017/183219
PCT Pub. Date: Oct. 26, 2017

(65) Prior Publication Data
US 2018/0251212 A1 Sep. 6, 2018

(30) Foreign Application Priority Data

Apr. 19, 2016 (JP) ................................ 2016-083269
Apr. 28, 2016 (JP) ................................ 2016-091332

(51) Int. Cl.
*B64C 25/00* (2006.01)
*B64C 25/34* (2006.01)
(Continued)

(52) U.S. Cl.
CPC .............. *B64C 25/34* (2013.01); *B64C 27/08* (2013.01); *B64C 39/024* (2013.01);
(Continued)

(58) Field of Classification Search
CPC ............ B64C 39/024; B64C 2025/325; B64C 2201/024; B64C 2201/027;
(Continued)

(56) References Cited

U.S. PATENT DOCUMENTS 8,794,564 B2    8/2014  Hutson
2016/0229534 A1* 8/2016 Hutson ................... B64C 27/08
(Continued)

FOREIGN PATENT DOCUMENTS

JP    2011-123006 A    6/2011
WO    2016/069169 A1   5/2016
WO    2017/051732 A1   3/2017

OTHER PUBLICATIONS

Oct. 11, 2016 International Search Report issued in International Patent Application No. PCT/JP2016/076151.

*Primary Examiner* — Richard G Davis
(74) *Attorney, Agent, or Firm* — Oliff PLC

(57) ABSTRACT

To provide an unmanned aerial vehicle that can allow its airframe to approach a structure surface safely and is able to move on a surface of the structure, while keeping a constant clearance between the structure surface and the airframe. This is solved by an manned aerial vehicle including one or a plurality of rotors and a plurality of rotating bodies having one or more driving sources, wherein at least a part of each of the rotating bodies in their rotational radius direction extends forth on an air intake side of the rotors relative to a position of rotational planes of the rotors, and negative pressure produced on the air intake side of the rotors causes the airframe to adhere by suction to a structure surface, and in this state, by driving the plurality of rotating bodies, the vehicle is enabled to travel on the surface.

7 Claims, 7 Drawing Sheets

(51) Int. Cl.
  *B64C 39/02*      (2006.01)
  *B64C 27/08*      (2006.01)
  *B64C 25/32*      (2006.01)
(52) U.S. Cl.
  CPC .. *B64C 2025/325* (2013.01); *B64C 2201/024* (2013.01); *B64C 2201/108* (2013.01); *B64C 2201/162* (2013.01)
(58) Field of Classification Search
  CPC ........ B64C 2201/108; B64C 2201/162; B64C 2201/165
  See application file for complete search history.

(56)  References Cited

U.S. PATENT DOCUMENTS

2017/0050726 A1\*  2/2017  Yamada .................. B64C 27/08
  2017/0209885 A1\*  7/2017  Neustadt ............... B64C 39/024
  2017/0274995 A1\*  9/2017  Yamada ................ B64C 39/003

\* cited by examiner

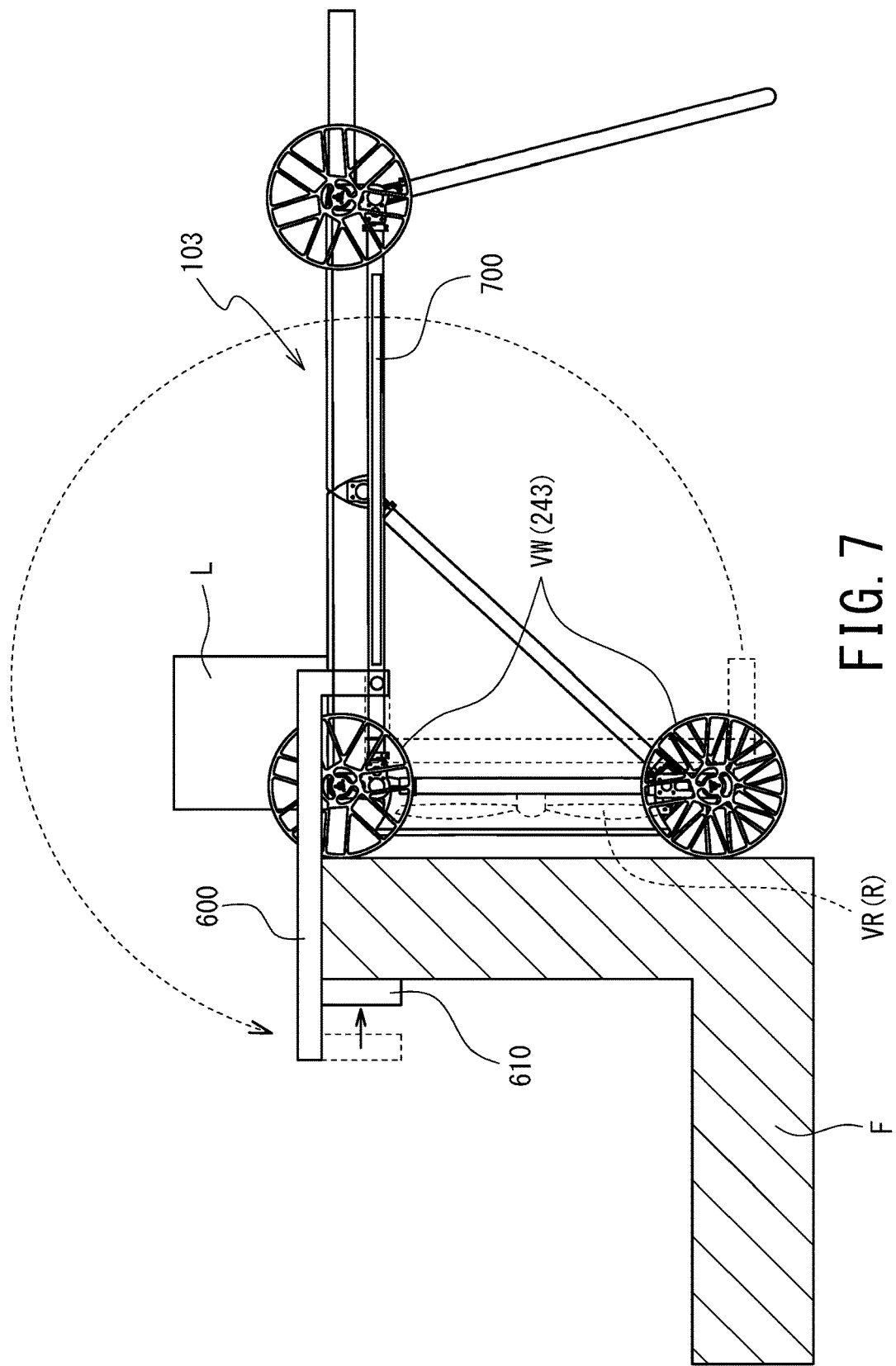

US 10,099,778 B2

UNMANNED AERIAL VEHICLE

TECHNICAL FIELD

The present invention relates to an unmanned aerial vehicle.

BACKGROUND ART

Conventionally, miniature unmanned aerial vehicles which are typified by unmanned helicopters for industrial use have been expensive and hard to obtain and manipulative skills have been needed to make them fly stably. However, an advance has lately been made in improvement and price reduction of a suite of sensors and software which are used for attitude control and autonomous flying of unmanned aerial vehicles and, consequently, maneuverability of unmanned aerial vehicles has improved dramatically. Especially as for miniature multicopters, since their rotor structure is simple as compared with that of helicopters and they are easy to design and maintain, attempts are now made to apply multicopters to diverse missions in a wide range of industrial fields, not only for hobby purposes.

CITATION LIST

Patent Literature

PTL1: JP 2011-123006 A

SUMMARY OF INVENTION

Technical Problem

Unmanned aerial vehicles such as multicopters have a problem in which their position in the air is hard to fixate as compared with vehicles placed on land, because of their nature of flying in the air. For instance, in a case where, inter alia, surface inspection of a structure which has been performed by a worker riding in a bucket or gondola of an elevating work platform is attempted to be performed using an unmanned aerial vehicle, it is hard for a commonly used unmanned aerial vehicle to fly, while keeping a constant distance to the surface for inspection, because a turbulent flow is liable to occur particularly under abridge beam and near the wall surfaces of a building among others.

In consideration of such a problem, a study is conducted on an airframe as below: wheels having a larger diameter than the airframe of an unmanned aerial vehicle are installed on both sides of the airframe and the airframe flies, while pressing these wheels against the surface for inspection, thus keeping a constant clearance between the surface for inspection and the airframe. However, for an unmanned aerial vehicle that moves, tilting the airframe, such as a multicopter, it is hard to continue to press the wheels against the surface for inspection that is present over the airframe.

In consideration of the foregoing problem, a problem to be solved by the present invention resides in providing an unmanned aerial vehicle that can allow its airframe to approach a structure surface safely and is able to move on the structure surface, while keeping a constant clearance between the structure surface and the airframe.

Solution to Problem

To solve the foregoing problem, an unmanned aerial vehicle of the present invention includes one or a plurality of rotors and a plurality of rotating bodies having one or more driving sources, wherein at least a part of each of the rotating bodies in their rotational radius direction extends forth on an air intake side of the rotors relative to a position of rotational planes of the rotors, and negative pressure produced on the air intake side of the rotors causes the airframe to adhere by suction to a structure surface, and in this state, by driving the plurality of rotating bodies, the vehicle is enabled to travel on the surface.

The rotating bodies extend forth from the rotors on its air intake side, and therefore, when the airframe is made to approach a structure that is present at the air intake side of the rotors, the rotating bodies will contact with the structure before the rotors. Hence, by disposing the plurality of rotating bodies properly with respect to the rotors, collision between a structure and the rotors can be made physically impossible and it is enabled to make the airframe approach a structure safely. Here, as "rotating bodies" in the present invention, not only wheels like tires but also caterpillar tracks which are called crawlers, crawler tracks, or the like can be used. An unmanned aerial vehicle of the present invention, provided with a configuration described above, uses negative pressure produced on the air intake side of the rotors to cause the airframe to adhere by suction to a structure surface, and in this state, by driving the plurality of rotating bodies, the vehicle is enabled to travel on the surface, while keeping a constant clearance between the structure and the airframe.

In addition, it is preferable that an unmanned aerial vehicle of the present invention includes a plurality of the rotors, wherein the plurality of rotors include horizontal rotors and vertical rotors with the axes extending in intersecting directions, and the plurality of rotating bodies include the rotating bodies extending forth on the air intake side of the horizontal rotors relative to a position of the rotational planes of the horizontal rotors and the rotating bodies extending forth on the air intake side of the vertical rotors relative to a position of the rotational planes of the vertical rotors.

An unmanned aerial vehicle of the present invention is provided with the horizontal rotors and the vertical rotors, and the rotating bodies extending forth on the air intake side of the rotors are disposed with respect to each of these rotors; thus, the vehicle can allow the airframe to easily adhere by suction to not only a ceiling surface like, e.g., the under surface of a bridge beam but also a vertical surface such as a wall surface of a building or a bridge pier. Thereby, the vehicle is enabled to continuously perform moving on from a ceiling surface to a vertical surface and vice versa.

In addition, it is preferable that an unmanned aerial vehicle of the present invention can change orientation of the airframe on the surface by rotating the respective rotating bodies disposed across the rotors in opposite directions to each other.

The airframe structure can be simplified by enabling it to change the orientation of the airframe on a structure surface by controlling the rotational direction of the respective rotating bodies without providing the rotating bodies with a steering mechanism separately. Furthermore, according to the present configuration, motion such as turning over the front-back orientation of the airframe on the spot also becomes possible and it is possible to move more flexibly and freely on a structure surface.

Also, a configuration may be such that the rotors and the plurality of rotating bodies are supported on a frame body comprised of pipe members, and the frame body has a lateral face in which the pipe member defining a lower side is placed outward in a horizontal direction relative to the pipe member defining an upper side.

A pipe member defining a lower side of a lateral face of the frame body is placed outward in a horizontal direction relative to a pipe member defining an upper side; thereby, when the lateral face of the frame body has been brought into contact with a vertical surface, the horizontal rotors with the frame body will tilt toward the vertical surface. Then, it is possible to press the airframe against the vertical surface by a component force which is directed toward the vertical surface of thrust produced by the horizontal rotors. This enables even an airframe only equipped with rotors that rotate in a horizontal plane to keep a constant distance to a vertical surface stably. Now, in this case, it is preferable to dispose the abovementioned rotating bodies, other wheels, or the like at four corners of such lateral face.

In addition, it is preferable that the plurality of rotors and the plurality of rotating bodies are supported on a frame body comprised of pipe members, and the frame body is formed in a generally L shape, as viewed from side.

The horizontal rotors and the vertical rotors are placed on the frame body having a generally L shape, as viewed from side, so that, when the airframe is made to adhere by suction to a ceiling surface using the horizontal rotors, and when the airframe is made to adhere by suction to a vertical surface using the vertical rotors, it can be prevented that other rotors impede such a motion.

Also, a configuration may be such that an unmanned aerial vehicle of the present invention further includes fixed wings, and the vertical rotors are used to produce thrust when the vehicle flies horizontally.

Because of being equipped with the horizontal rotors and the vertical rotors, it is possible to use the vertical rotors to produce thrust when the vehicle files horizontally.

Also, a configuration may be such that an unmanned aerial vehicle of the present invention further includes an arm with a hook portion formed at its forward end, and the airframe can be supported with the arm by stretching the arm over a fence-like structure and making the hook portion engage onto a back surface of the fence-like structure.

For instance, after loading a parcel on an unmanned aerial vehicle of the present invention for home delivery, when delivering the parcel to a balcony of collective housing, making the airframe continue to adhere by suction to the balcony fence until a resident receives the parcel is not favorable in terms of battery efficiency. Additionally, since the rotors are sharp, if a resident takes the delivered parcel, while the rotors are rotating, there is a fear that the resident gets injured. The unmanned aerial vehicle of the present invention is equipped with the arm with the hook and the airframe can be anchored onto a fence-like structure with that arm, so that a resident can take the delivered parcel with the rotors deactivated. In addition, even in a case where it takes some time until a resident takes the delivered parcel, it is possible to ensure electric power for homing.

Advantageous Effects of Invention

As described above, according to an unmanned aerial vehicle of the present invention, it is possible to allow its airframe to approach a structure surface safely and to move on the structure surface, while keeping a constant clearance between the structure surface and the airframe.

BRIEF DESCRIPTION OF DRAWINGS

FIG. 7 is a schematic lateral diagram depicting a situation in which the airframe is anchored onto a balcony fence with an arm.

DESCRIPTION OF EMBODIMENTS

In the following, embodiments of an unmanned aerial vehicle of the present invention will be described with the aid of the drawings. Embodiments which will be described hereinafter are examples of a multicopter which is a type of an unmanned aerial vehicle equipped with a plurality of rotors. In the following description, "up" and "down" refer to upward and downward directions in FIG. 1, which are parallel with a Z-axis direction denoted in a coordinate axes indicator in FIG. 1. Also, "horizontal" refers to an X-Y plane direction denoted in the same coordinate axes indicator. "Front" and "back" refer to front and back directions in FIG. 1, which are parallel with an X-axis direction denoted in the coordinate axes indicator in FIG. 1. "Right" and "left" refer to right and left directions in FIG. 1, as viewed from a reader's point of view, which are parallel with a Y-axis direction denoted in the coordinate axes indicator in FIG. 1.

First Embodiment (General Description of Configuration)

Figure 1:
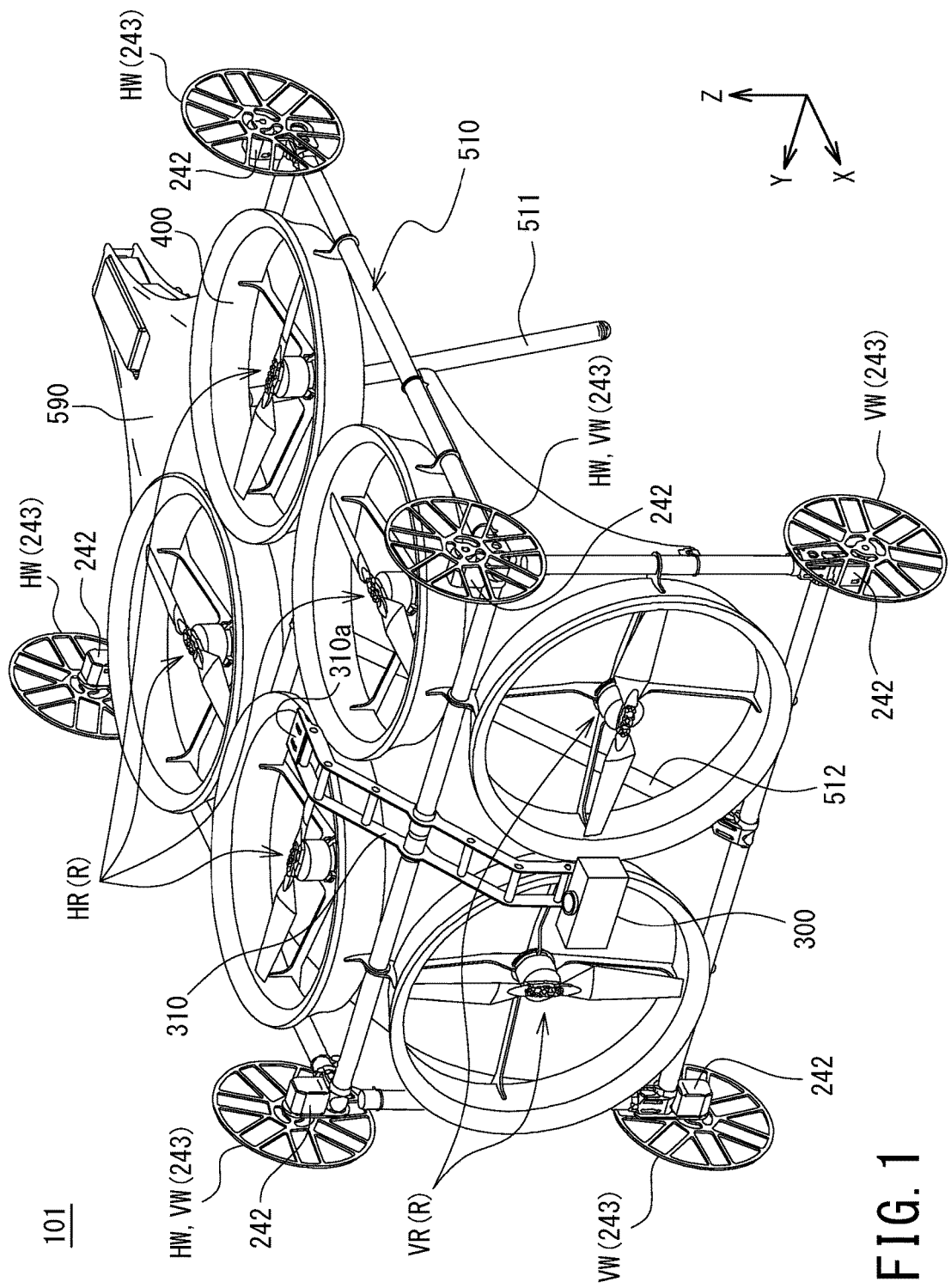
FIG. 1 is a perspective view depicting an external appearance of a multicopter pertaining to a first embodiment
Figure 2:
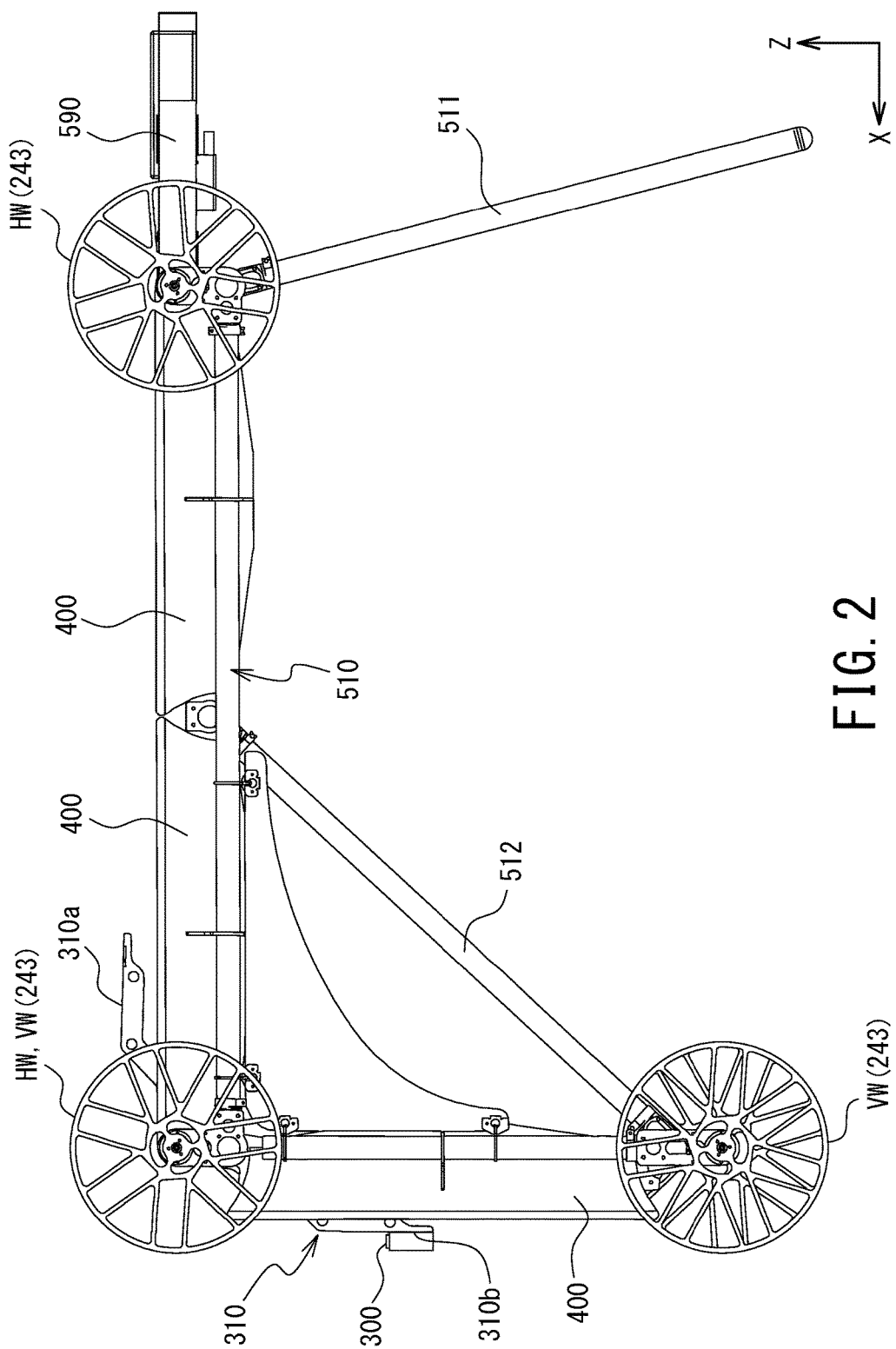
FIG. 2 is a side view depicting an external appearance of the multicopter.

FIG. 1 is a perspective view depicting an external appearance of a multicopter 101 pertaining to a first embodiment and FIG. 2 is a side view depicting an external appearance of the multicopter 101.

The multicopter 101 is equipped with a plurality of rotors R and these rotors R are comprised of four horizontal rotors HR and two vertical rotors VR. The horizontal rotors HR and vertical rotors VR are disposed such that the axes of rotation of the horizontal and vertical rotors extend in directions perpendicular to each other. The four horizontal rotors HR are arranged horizontally and disposed right and left and front and back in two rows. The two vertical rotors VR are disposed, arranged right and left with their intake sides oriented toward the front. All the horizontal rotors HR and vertical rotors VR are ducted fans whose circumference is surrounded by a duct 400. Now, in the present invention, "horizontal rotors" refer to rotors in which the rotational plane is placed to be horizontal or substantially horizontal and "vertical rotors" refer to rotors in which the rotational plane is placed to be vertical or substantially vertical.

The horizontal rotors HR and vertical rotors VR are supported on a frame body 510 comprised of pipe members and having a generally L shape, as viewed from side. Six tires 243 which are rotating bodies are further supported on the frame body 510. All the six tires 243 are drive wheels equipped with a motor 242 which is a driving source. For the six tires 243, the directions of their axes of rotation are oriented toward directions perpendicular to the directions in which the axes of the horizontal rotors HR and vertical rotors VR extend.

The six tires 243 are comprised of four tires HW for a ceiling surface placed across the four horizontal rotors HR and on the right and left sides of these rotors HR and tires VW for a vertical surface placed across the two vertical rotors VR and on the right and left sides of these rotors VR. For the tires HW for a ceiling surface, their top edge in a tire's radial direction is positioned on an air intake side (upper) of the horizontal rotors HR relative to position of rotational planes of the horizontal rotors HW and extends forth on the air intake side (upper) relative to the air intake side edge of the ducts 400 of the horizontal rotors HR. Also, for the tires VW for a vertical surface, their forward edge in a tire's radial direction is positioned on the air intake side (forward) of the vertical rotors VR relative to position of rotational planes of the vertical rotors VR and extends forth on the air intake side (forward) relative to the air intake side edge of the ducts 400 of the vertical rotors VR. Now, the tires 243 placed at the corners of the generally L shape of the frame body 510, as viewed from side, serve as both a tire HW for a ceiling surface and a tire VW for a vertical surface.

In the rear of the frame body 510, a control box 590 is placed which is a case body in which, inter alia, a control device of the multicopter 101 is accommodated. Also, a stand 511 which is a pipe member to support the rear of the frame body 510 when landing is connected to the rear of the frame body 510. Also, a reinforcement part 512 which is a T shape pipe member to support a central region of the four horizontal rotors HR is connected to a pipe member defining a lower side of pipe members defining a front face of the frame body 510.

A camera platform 310 on which a camera 300 is fixed is installed on a pipe member defining an upper side of the pipe members defining the front face of the frame body 510. The camera platform 310 is provided with holding portions 310a, 310b to fix cameras 300 at its both ends in its longitudinal direction. A camera 300 which captures a forward view is fixed in an upper holding portion 310a of the camera platform 310. A camera 300 which captures an upward view is fixed in a forward holding portion 310b of the camera platform 310. Thus, it is possible to ensure a proper distance between an object whose image is to be captured and a camera 300. Now, the tires HW for a ceiling surface extend upward relative to the camera 300 fixed in the holding portion 310a and the tires VW for a vertical surface extend forward relative to the camera 300 fixed in the holding portion 310b.

(Traveling on a Wall Surface)

In the multicopter 101, a part of each of the tires 243 extends forth on the air intake side of the rotors R relative to the position of the rotational planes of the rotors R. Therefore, when the airframe is made to approach a structure S that is present at the air intake side of the rotors R, the tires 243 will contact with the structure S before the rotors R. That is, the multicopter 101 is configured such that no collision between the structure S and the rotors R can occur, and thus, the multicopter is enabled to allow the airframe to approach the structure S safely.

In addition, since the multicopter 101 is provided with the configuration described above, negative pressure produced on the air intake side of the rotors R causes the airframe to adhere by suction to a surface of a structure S, and in this state, by driving the tires 243, the multicopter is enabled to travel on the structure S surface, while keeping a constant clearance between the structure S and the airframe. More- over, since all the rotors R in the present embodiment are ducted fans, as described above, a vortex flow produced in the wing edge of each rotor R is rectified to an air flow in a direction of axis by the duct 400 of the rotor, so that negative pressure on the air intake side of the duct 400 is increased and stabilized. This makes it possible to allow the airframe to adhere fast by suction to the structure S.

Figure 3:
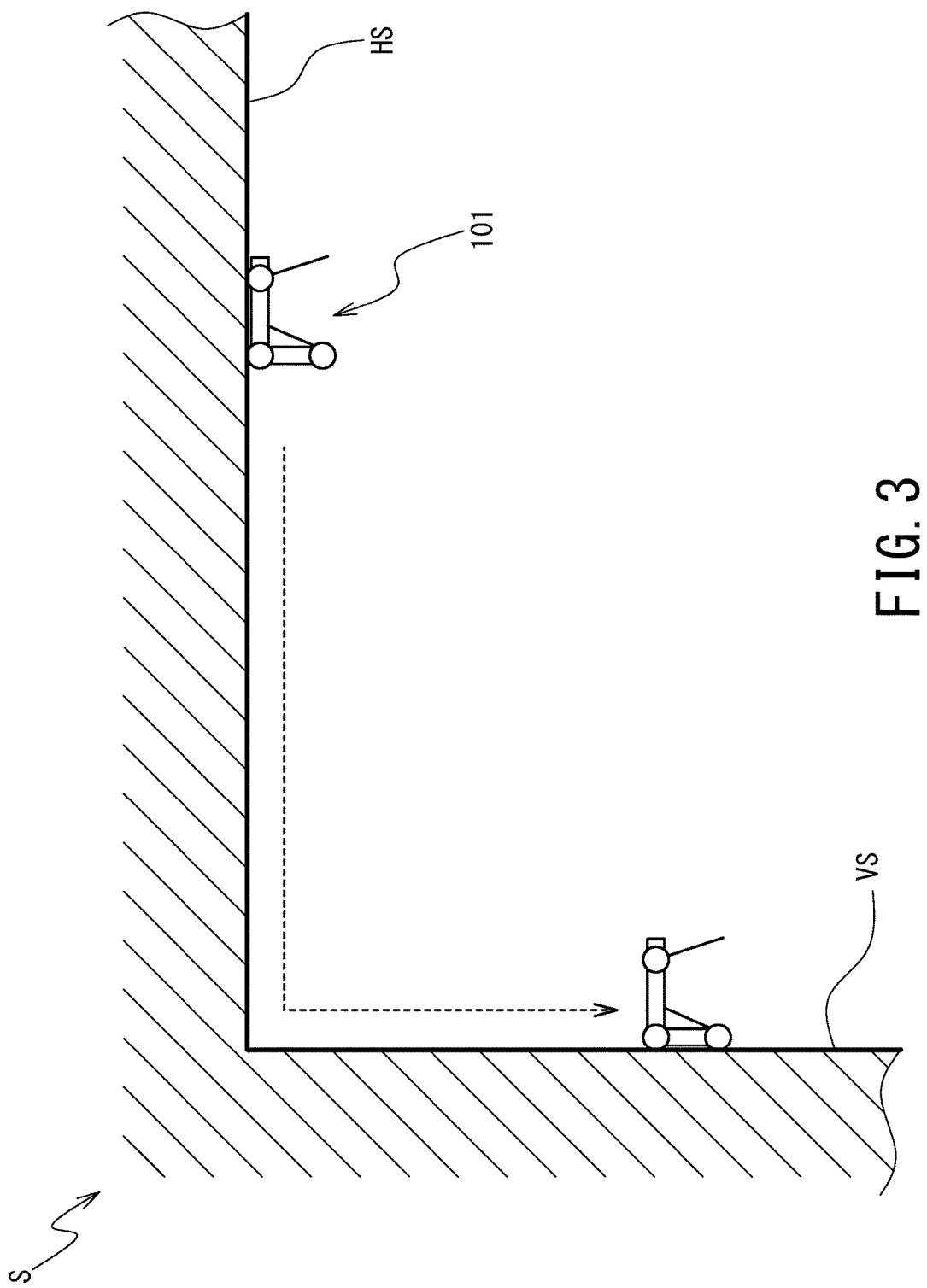
FIG. 3 is a schematic diagram depicting a situation in which the multicopter travels on a wall surface, moving on a horizontal surface and a vertical surface.

FIG. 3 is a schematic diagram depicting a situation in which the multicopter 101 travels on a wall surface, moving on a horizontal surface and a vertical surface. The multi- copter 101 of the present embodiment is provided with the horizontal rotors HR and the vertical rotors VR and further provided with the tires HW for a ceiling surface and the tires VW for a vertical surface extending forth on the air intake side of each of the horizontal rotors HR and the vertical rotors VR; thus, the multicopter can allow the airframe to easily adhere by suction to not only a ceiling surface HS like, e.g., the under surface of a bridge beam but also a vertical surface VS such as a wall surface of a building or a bridge pier. Thereby, the multicopter is enabled to continuously perform moving on from a ceiling surface HS to a vertical surface VS and vice versa, as depicted in FIG. 3.

In addition, in the multicopter 101, the rotors R and the tires 143 are disposed on the frame body 510 having a generally L shape, as viewed from side; thus, when the airframe is made to adhere by suction to a ceiling surface HS using the horizontal rotors HR, and when the airframe is made to adhere by suction to a vertical surface VS using the vertical rotors VR, it is prevented that other rotors R impede such a motion.

Also, the multicopter 101 of the present embodiment can change the orientation and direction of movement of the airframe on a ceiling surface HS or a vertical surface VS by controlling the rotating speed and rotational direction of the respective tires HW for a ceiling surface disposed on the right and left sides of the horizontal rotors HR or the respective tires VW for a vertical surface disposed on the right and left sides of the vertical rotors VR. The airframe structure of the multicopter 101 is simplified by enabling it to change the orientation of the airframe on a surface of a structure S according to the rotating speed and rotational direction of the respective tires 243 without providing the tires 243 with a steering mechanism separately. Further- more, according to the present embodiment, motion such as turning over the front-back orientation of the airframe on the spot also becomes possible, and it is possible to move more flexibly and freely on a structure S surface.

(Flight Function)

Figure 4:
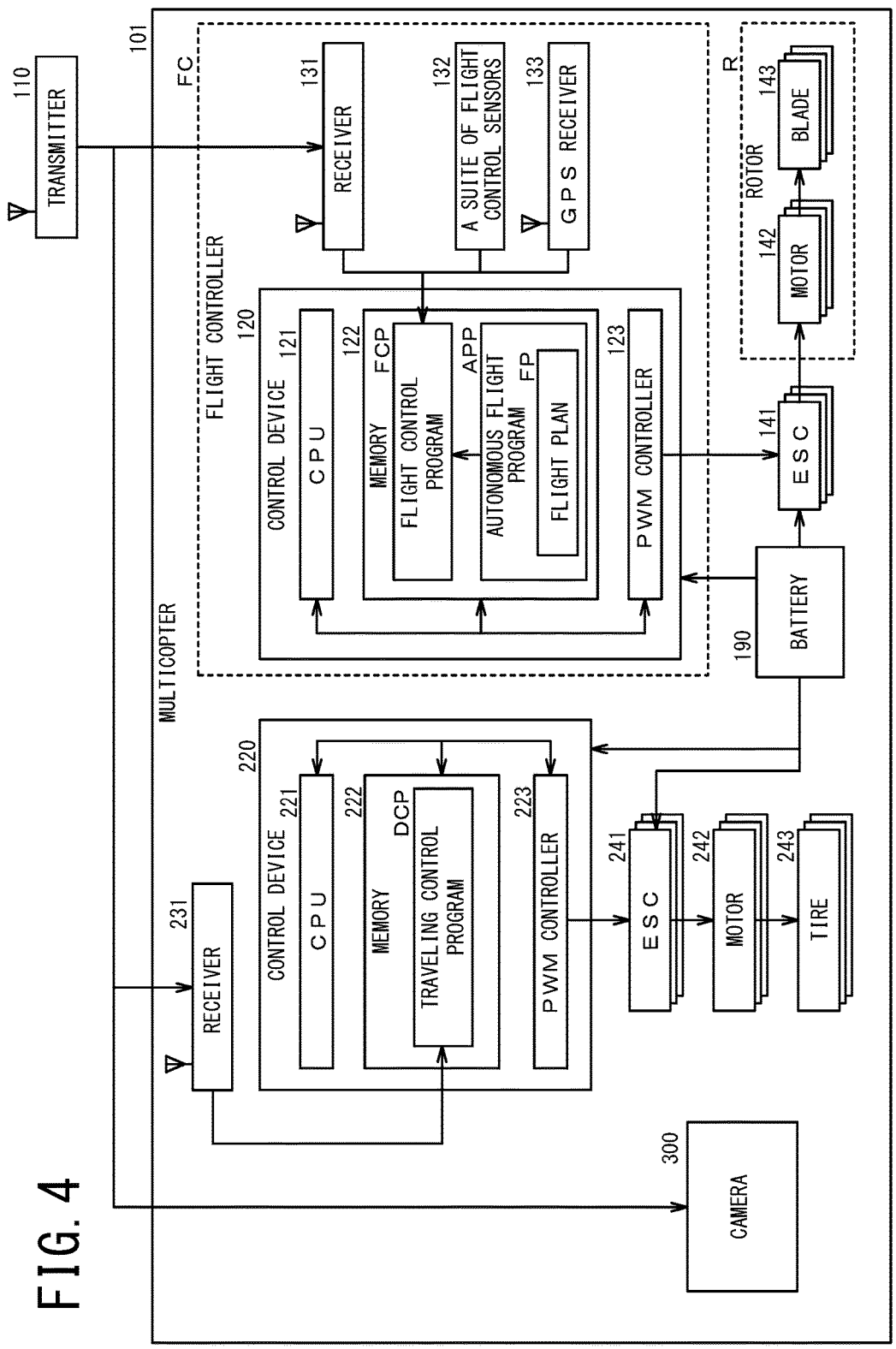
FIG. 4 is a block diagram depicting a functional configuration of the multicopter.

FIG. 4 is a block diagram depicting a functional configu- ration of the multicopter 101. A flight function of the multicopter 101 is comprised mainly of a flight controller FC, a plurality of rotors R which are rotary wings, an ESC (Electric Speed Controller) 141 provided for each rotor R, and a battery 190 which supplies power to these compo- nents. A basic flight function of the multicopter 101 is described below.

Each rotor R is comprised of a motor 142 and a blade 143 coupled to the motor output shaft. The ESC 141 is connected to the motor 142 of the rotor R and rotates the motor 142 at speed commanded from the flight controller FC.

The flight controller FC includes a receiver 131 to receive a piloting signal from an operator (transmitter 110) and a control device 120, which is a microcontroller, to which the receiver 131 is connected. The control device 120 includes a CPU 121 which is a central processing unit, a memory 122 which is a storage device such as ROM and RAM, and a PWM (Pulse Width Modulation) controller 123 which controls the rotating speed of each motor 142 via the ESC 141.

The flight controller FC further includes a suite of flight control sensors 132 and a GPS receiver 133 (these are hereinafter also referred to as "sensors and other equipment") which are connected to the control device 120. In the suite of fight control sensors 132 of the multicopter 101 in the present embodiment, a triaxial acceleration sensor, a triaxial angular velocity sensor, an atmospheric pressure sensor (an altitude sensor), a geomagnetic sensor (a direction sensor), etc. are included. Through these sensors and other equipment, the control device 120 is adapted to be able to acquire the aircraft's positional information including latitude/longitude, altitude, and a heading azimuth of the aircraft's nose, in addition to a tilt and turn of the airframe.

In the memory 122 of the control device 120, a flight control program FCP, i.e., a program is stored in which algorithms are programmed to control attitude and basic flying operations when the multicopter 101 files. According to a command from the operator, the flight control program FCP causes the multicopter 101 to fly, while adjusting the rotating speed of the respective rotors R and compensating the airframe attitude and positional misalignment, based on information acquired from the sensors and other equipment.

Piloting the multicopter 101 is performed manually by the operator using the transmitter 110. Additionally, with a flight plan FP, i.e., parameters such as, e.g., a flight route, speed, and altitude which should be preregistered into an autonomous flight program APP, it is also possible to cause the multicopter 101 to fly autonomously to a destination (such an autonomous flight will hereinafter be referred to as "autopilot").

The multicopter 101 in the present embodiment is thus provided with enhanced flight control functionality. However, an unmanned aerial vehicle in the present invention is not limited to the configuration of the multicopter 101; for example, an airframe in which some of the sensors and other equipment are dispensed with and an airframe which is able to fly only by manual piloting without being provided with an autopilot function can also be used.

(Function of Traveling on a Wall Surface)

The multicopter 101 further includes a receiver 231 which receives a piloting signal from the operator (transmitter 110) and a control device 220 which is a microcontroller to which the receiver 231 is connected. The control device 220 includes a CPU 221 which is a central processing unit, a memory 222 which is a storage device such as ROM and RAM, and a PWM controller 223 which controls the rotating speed of each motor 242 and each tire 243 via an ESC 241. In the memory 222 of the control device 220, a traveling control program DCP is stored which is a program to control traveling of the airframe on a surface of a structure S.

A function of traveling on a wall surface, comprised in the multicopter 101, is implemented by the foregoing fight function and the traveling control program DCP. After the multicopter 101 has reached a ceiling surface HS or vertical surface VS of a structure S, the flight control program FCP drives the horizontal rotors HR and vertical rotors VRs only for making the airframe adhere by suction to the ceiling surface HS and vertical surface VS. Then, the traveling control program DCP drives the tires 243 to move the multicopter 101 on the surface of the structure S according to a command from the operator.

Now, in the present embodiment, the traveling control program DCP is placed in another control device 220, separated from the flight control program FCP; however, the traveling control program DCP and the PWM controller 223 may be placed in the control device 120 and the control device 220 and the receiver 231 can be dispensed with, if the processing capacity of the control device 120 is enough to permit it. In addition, in the multicopter 101 of the present embodiment, moving the multicopter 101 on a surface of a structure S is assumed to be performed manually by the operator basically; however, with parameters such as a traveling route and speed of the multicopter 101 which should be set in advance or should be set in each case, while observing conditions of the surface of the structure S and the multicopter 101, a function that causes the multicopter 101 to travel autonomously or semi-autonomously on the structure S surface may be implemented.

Second Embodiment

A second embodiment of an unmanned aerial vehicle of the present invention is described below with the aid of a drawing. In the following description, a component having the same or a similar function as in the foregoing embodiment is assigned the same reference designator as in the foregoing embodiment and its detailed description is omitted.

Figure 5:
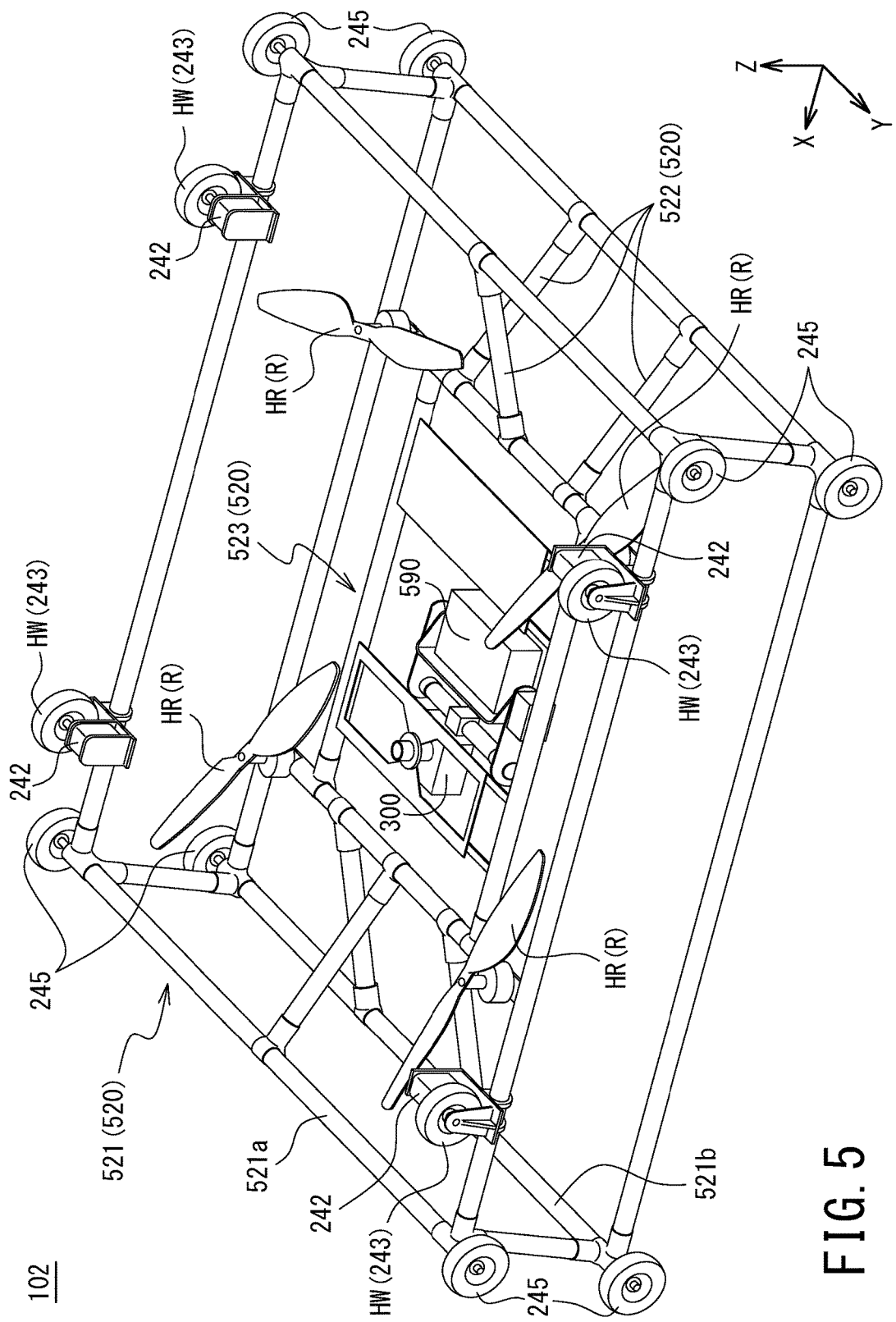
FIG. 5 is a perspective view depicting an external appearance of a multicopter pertaining to a second embodiment.

FIG. 5 is a per view depicting an external appearance of a multicopter 102 pertaining to the second embodiment. The multicopter 102 is an airframe that is equipped with only four horizontal rotors HR as rotors R. On the air intake side (upper) of these horizontal rotors HR, four tires HW for a ceiling surface which are tires 243 equipped with a motor 242 are disposed.

The multicopter 102 includes a frame body 520 to support the horizontal rotors HR and the tires HW for a ceiling surface. The frame body 520 includes an outer frame 521 which is a frame body having a generally cuboid shape and comprised of pipe members and a generally rectangular inner frame 523 also comprised of pipe members and supported inside the outer frame 521 by connecting pipes 522. A control box 590 of the multicopter 102 and a camera 300 are supported on the inner frame 523. Also, tires 245 not equipped with a driving source are disposed at portions corresponding to the respective apexes of the outer frame 521.

Of pipe members defining a front face (a left-hand face as viewed in FIG. 5 in the X-axis direction) of the outer frame 521, a pipe member 521b defining a lower side is placed outward in a horizontal direction relative to a pipe member 521a defining an upper side. Thereby, when the front face of the outer fame 521 has been brought into contact with a vertical surface VS, the horizontal rotors HR with the frame body 520 will tilt toward the vertical surface VS. Then, the airframe is pressed against the vertical surface VS by a component force directed toward the vertical surface VS of thrust produced by the horizontal rotors HR. This enables the multicopter 102 to travel on a wall surface, particularly, on a ceiling surface HS and keep a constant distance to a vertical surface VS stably.

Third Embodiment

A third embodiment of an unmanned aerial vehicle of the present invention is described below with the aid of a drawing. In the following description, a component having the same or a similar function as in the foregoing embodiment is assigned the same reference designator as in the foregoing embodiment and its detailed description is omitted.

Figure 6:
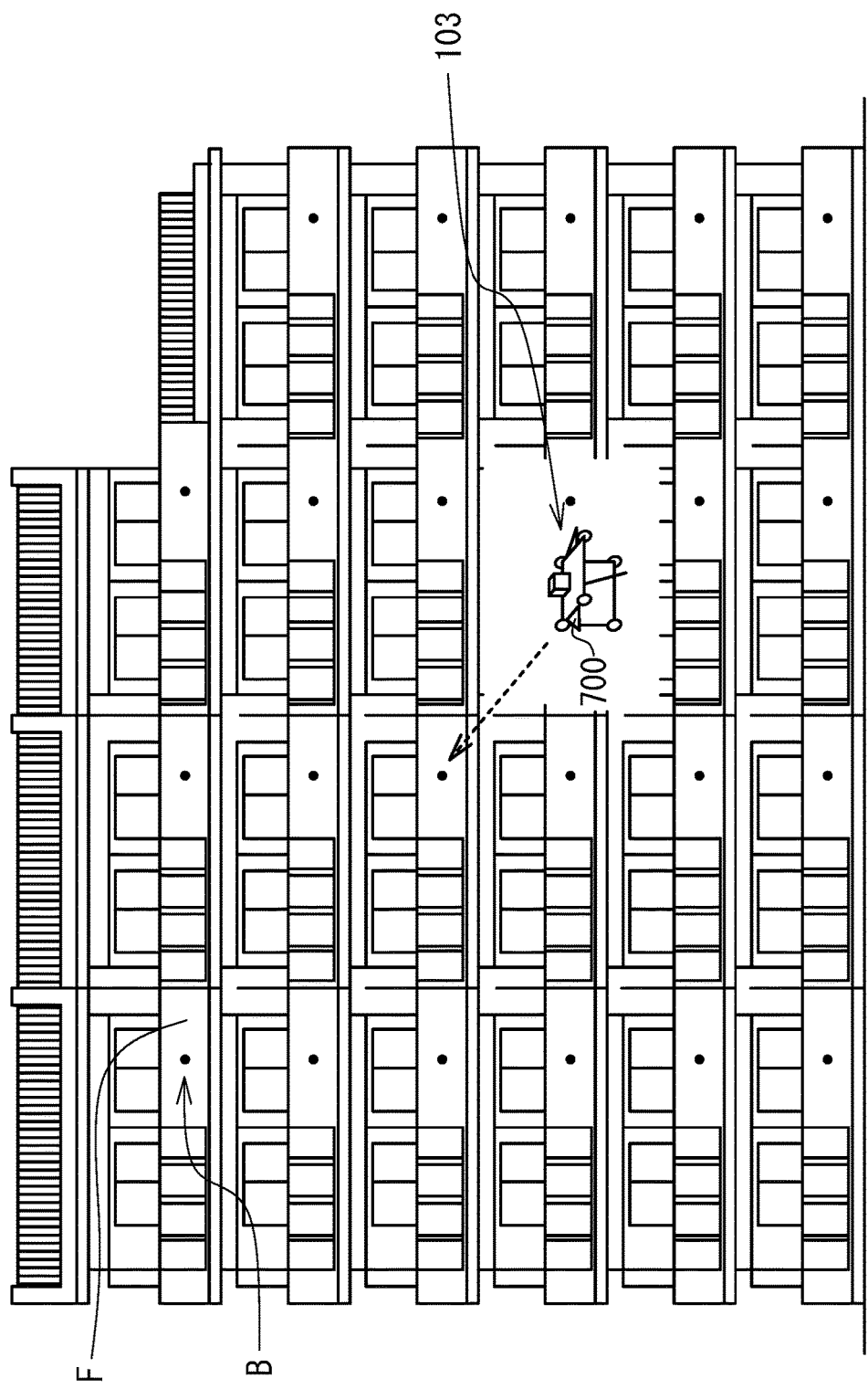
FIG. 6 is a schematic diagram depicting a situation of home delivery using a multicopter pertaining to a third embodiment to deliver a parcel to a given balcony of general collective housing.

FIG. 6 is a schematic diagram depicting a method of home delivery using a multicopter 103 pertaining to a third embodiment to deliver a parcel L to a balcony of general collective housing. The parcel L is secured on the top of the multicopter 103. Now, a basic configuration and functions of the multicopter 103 are the same as the multicopter 101, except for features of the multicopters 103 which are described below.

The multicopter 103 of the present embodiment flies to a location of collective housing which is a destination of home delivery, using the GPS receiver 133. The multicopter 103 is equipped with fixed wings 700 and the vertical rotors VR are used to produce thrust in a horizontal direction when moving to the collective housing.

In the balconies of respective homes in the collective housing, a signal transmitter B such as LED, Bluetooth (registered trademark), or a Low Energy beacon is installed in advance. After the multicopter 103 has approached the collective housing sufficiently, the multicopter 103 receives a signal from the signal transmitter B through image capturing means or near field communication means and identifies one home which is a destination to deliver the parcel L. In addition, also when making the airframe adhere by suction to a balcony fence F, the multicopter 103 adjusts the airframe to an optimal position with reference to the installation position of the signal transmitter B.

FIG. 7 is a schematic lateral diagram depicting a situation in which the airframe is anchored onto the balcony fence F with an arm 600. The multicopter 103 adheres by suction to the balcony fence F using the vertical rotors VR, stretches the arm 600 over the balcony fence F, and makes a hook portion 610 of the arm 600 engage onto a back surface of the fence F. Then, the vertical rotors VR and horizontal rotors HR are deactivated and the airframe is supported by the arm 600. Now, the position of the hook portion 610 can be adjusted depending on thickness of the fence F. When a resident receives the parcel L, the multicopter 103 detects it by a pressure-sensitive sensor or the like and, after waiting for a certain time, detaches the arm 600 from the fence F and leaves the balcony.

After loading a parcel on the multicopter 103 for home delivery, when delivering the parcel L to a balcony of collective housing, making the airframe continue to adhere by suction to the balcony fence F until a resident receives the parcel L is not favorable in terms of battery efficiency. Additionally, because the rotors R are sharp, if a resident takes the delivered parcel L while the rotors R are rotating, there is a fear that the resident gets injured. The multicopter 103 is equipped with the arm 600 with the hook and the airframe is anchored onto the balcony fence F with that arm 600, so that a resident can take the delivered parcel L with the rotors R deactivated. In addition, even in a case where it takes some time until the resident takes the delivered parcel, it is possible to ensure electric power for homing.

While embodiments of the present invention have been described hereinbefore, the present invention is not limited to the foregoing embodiments and can be modified in various ways without departing from the gist of the present invention. For example, although all the multicopters 101, 102, 103 of the foregoing embodiments are equipped with a plurality of rotors R, an unmanned aerial vehicle of the present invention may be an airframe with only one horizontal rotor HR. In addition, the horizontal rotors HR and the vertical rotors VR in the foregoing embodiments are disposed such that the axes of rotation of the horizontal and vertical rotors extend in directions perpendicular to each other; however, it is not always needed to dispose these rotors with their axes of rotation extending in directions perpendicular to each other, and it is only required to dispose these rotors with their axes of rotation intersecting with each other so that the airframe can easily adhere by suction to both a ceiling surface HS and a vertical surface VS. Additionally, as "rotating bodies" in the present invention, not only wheels like tires 273 but also caterpillar tracks which are called crawlers, crawler tracks, or the like can be used.

The invention claimed is:

1. An unmanned aerial vehicle comprising:
one or a plurality of rotors; and
a plurality of rotating bodies having one or more driving sources,
wherein at least apart of each of the rotating bodies in their rotational radius direction extends forth on an air intake side of the rotors relative to a position of rotational planes of the rotors; and
negative pressure produced on the air intake side of the rotors causes the airframe to adhere by suction to a structure surface, and in this state, by driving the plurality of rotating bodies, the vehicle is enabled to travel on the surface.

2. The unmanned aerial vehicle according to claim 1, comprising a plurality of the rotors,
wherein the plurality of rotors include horizontal rotors and vertical rotors with the axes of rotation extending in intersecting directions; and
the plurality of rotating bodies include the rotating bodies extending forth on the air intake side of the horizontal rotors relative to a position of the rotational planes of the horizontal rotors and the rotating bodies extending forth on the air intake side of the vertical rotors relative to a position of the rotational planes of the vertical rotors.

3. The unmanned aerial vehicle according to claim 1, wherein orientation of the airframe on the surface can be changed by rotating the respective rotating bodies disposed across the rotors in opposite directions to each other.

4. The unmanned aerial vehicle according to claim 1,
wherein the rotors and the plurality of rotating bodies are supported on a frame body comprised of pipe members; and
the frame body has a lateral face in which the pipe member defining a lower side is placed outward in a horizontal direction relative to the pipe member defining an upper side.

5. The unmanned aerial vehicle according to claim 2,
wherein the plurality of rotors and the plurality of rotating bodies are supported on a frame body comprised of pipe members; and
the frame body is formed in a generally L shape, as viewed from side.

6. The unmanned aerial vehicle according to claim 2, further comprising fixed wings,
wherein the vertical rotors are used to produce thrust when the vehicle flies horizontally.

7. The unmanned aerial vehicle according to claim 1, further comprising an arm with a hook portion formed at its forward end,
wherein the airframe can be supported with the arm by stretching the arm over a fence-like structure and making the hook portion engage onto a back surface of the fence-like structure.

* * * * *